United States Patent [19]
Grandpierre et al.

[11] Patent Number: 5,724,178
[45] Date of Patent: Mar. 3, 1998

[54] AMPLITUDE MODULATION CIRCUIT HAVING AN ELECTRO-ABSORPTION MODULATOR

[75] Inventors: Georges Grandpierre, Guibeville; Eric Brandon, Bourg la Reine, both of France

[73] Assignee: Alcatel Submarine Networks, Clichy, France

[21] Appl. No.: 734,604

[22] Filed: Oct. 22, 1996

[30] Foreign Application Priority Data

Oct. 23, 1995 [FR] France ................... 95 12436

[51] Int. Cl.⁶ ..................................... G02F 1/01
[52] U.S. Cl. ................. 359/289; 359/276; 372/26; 372/38
[58] Field of Search ................ 359/289, 276, 359/320, 282; 372/26, 38

[56] References Cited

U.S. PATENT DOCUMENTS

| | | | |
|---|---|---|---|
| 5,208,817 | 5/1993 | Kao et al. | 372/26 |
| 5,317,581 | 5/1994 | Onishi et al. | 372/38 |
| 5,629,792 | 5/1997 | Masaki | 359/276 |
| 5,663,823 | 9/1997 | Suzuki | 359/276 |

FOREIGN PATENT DOCUMENTS

| | | |
|---|---|---|
| 0444688A2 | 9/1991 | European Pat. Off. . |
| 0547394A2 | 6/1993 | European Pat. Off. . |
| 0594088A1 | 4/1994 | European Pat. Off. . |
| 4227097A1 | 2/1994 | Germany . |

*Primary Examiner*—Loha Ben
*Attorney, Agent, or Firm*—Sughrue, Mion, Zinn, Macpeak & Seas, PLLC

[57] ABSTRACT

The invention provides a circuit for amplitude modulating an optical signal with an N-state electrical signal where N is greater than or equal to 2, the circuit comprising a modulator having a first input for receiving the optical signal to be modulated and a second input for receiving a modulating electrical signal. According to the invention, the circuit comprises, upstream from the second input, shaping component having an input receiving the N-state electrical signal and having an output that switches from one of the N states to another of the N states in response to the N-state electrical signal taking up a level that is greater than a predetermined threshold, and switching from the other state to the one of the N states in response to the N-state electrical signal taking up a level that is less than the predetermined threshold, the predetermined threshold being associated with the pair of states, and having a level that lies between and is different from the respective levels taken by the two states.

8 Claims, 2 Drawing Sheets

AMPLITUDE MODULATION CIRCUIT HAVING AN ELECTRO-ABSORPTION MODULATOR

The present invention relates in general to a modulator for amplitude modulating an optical signal by an electrical signal to be sent. More precisely, the invention relates to such a circuit operating with N-state amplitude modulation where $N \geq 2$, referred to as amplitude shift keying (ASK).

BACKGROUND OF THE INVENTION

Typically, such a circuit uses an electroabsorption modulator that has a first input receiving an optical signal produced by a laser source and a second input receiving an electrical signal that has N-state modulation. It has an output on which it produces an optical signal that is amplitude modulated. When the electrical modulation signal is a binary signal, the modulated optical signal SM(t) at the output of the electroabsorption modulator, has amplitude A(t) where $SM(t)=A(t).\cos(\omega t)$, $\omega$ being the angular frequency of the optical signal, which amplitude takes one of two states $A(t)=0$ and $A(t)=A_{max}$ respectively, depending on whether the binary electrical signal is in the "0" state referred to as the first state, or whether the binary electrical signal is in the "1" state, referred to as the second state.

In FIG. 1, a first quadrant of a Cartesian diagram represents the voltage V of a binary electrical signal that is non-modulated as a function of time t, a second quadrant gives the curve C representing the power P of the modulated optical signal present at the output from the electroabsorption modulator as a function of the voltage V of the modulating electrical signal, and a third quadrant shows the power P of the modulated optical signal at the output from the modulator as a function of time t when the modulating binary electrical signal shown in the first quadrant is applied to its modulation input. The bits of the modulating binary electrical signal are substantially trapezoidal, each bit having sloping rising and falling edges. The envelope of the modulated optical signal from the modulator can be represented in the form of an eye diagram 02 by projecting an eye diagram 01 of the modulating electrical signal onto the curve C, and then projecting it off again.

When this diagram is studied, it can be seen that for a modulating electrical signal whose bits form an eye diagram that is symmetrical about a mean voltage level X1, the eye diagram 02 of the envelope of the modulated optical signal is asymmetrical, with the rising and falling "edges" of the envelope not intersecting at a level that is halfway between the maximum power level $P_{max}$ and the minimum power level $P_{min}$. For given reception error rate, this lack of symmetry puts a limit on the maximum distance that can be travelled by the modulated optical signal.

OBJECT AND SUMMARY OF THE INVENTION

The invention thus seeks to remedy the above drawback by providing a circuit that is particularly advantageous for amplitude modulating an optical signal with a binary electrical signal.

To this end, the present invention provides a circuit for amplitude modulating an optical signal with an N-state electrical signal, N being greater than or equal to 2, comprising:

a modulator having a first input for receiving said optical signal to be modulated and a second input for receiving a modulating electrical signal;

said circuit further comprising, upstream from the second input, shaping means having an input receiving said N-state electrical signal and having an output that switches from one of said N states to another of said N states in response to said N-state electrical signal taking up a level that is greater than a predetermined threshold, and switching from said other state to said one of the N states in response to said N-state electrical signal taking up a level that is less than said predetermined threshold, said predetermined threshold being associated with said pair of states (said one state and said other state), and having a level that lies between and is different from the respective levels taken by said two states.

In an embodiment, said N-state electrical signal is a binary electrical signal having two states, referred to as a first state and as a second state, and the output of said shaping means switches from the first state to the second state in response to said binary electrical signal taking up a level that is greater than a predetermined threshold, and switches from said second state to said first state in response to said binary electrical signal taking up a level that is less than said predetermined threshold.

In this embodiment, said shaping means are in the form of a two-input OR gate having one of its two inputs receiving said binary electrical signal and having the other of its two inputs connected to said first state, said predetermined threshold corresponding to a reference voltage for said OR gate.

Said shaping means may also be in the form of a comparator receiving said binary electrical signal on a non-inverting input and receiving the reference signal on an inverting input.

Typically, said optical signal is produced by a laser source.

Further, the output of the shaping means may be applied to the second input of the modulator which is of the electroabsorption modulator type via an amplifier and a bias T connected in series.

BRIEF DESCRIPTION OF THE DRAWINGS

Other characteristics and advantages of the present invention appear more clearly on reading the following description given with reference to the corresponding accompanying drawings, in which.

MORE DETAILED DESCRIPTION

The description below is restricted to the case of modulating an optical signal with an electrical signal that is binary, i.e. an electrical signal having N=2 states. Nevertheless, the person skilled in the art will understand that the invention can be extended to modulation by means of an electrical signal defining an arbitrary number N of states where N is greater than or equal to 2.

Figure 2:
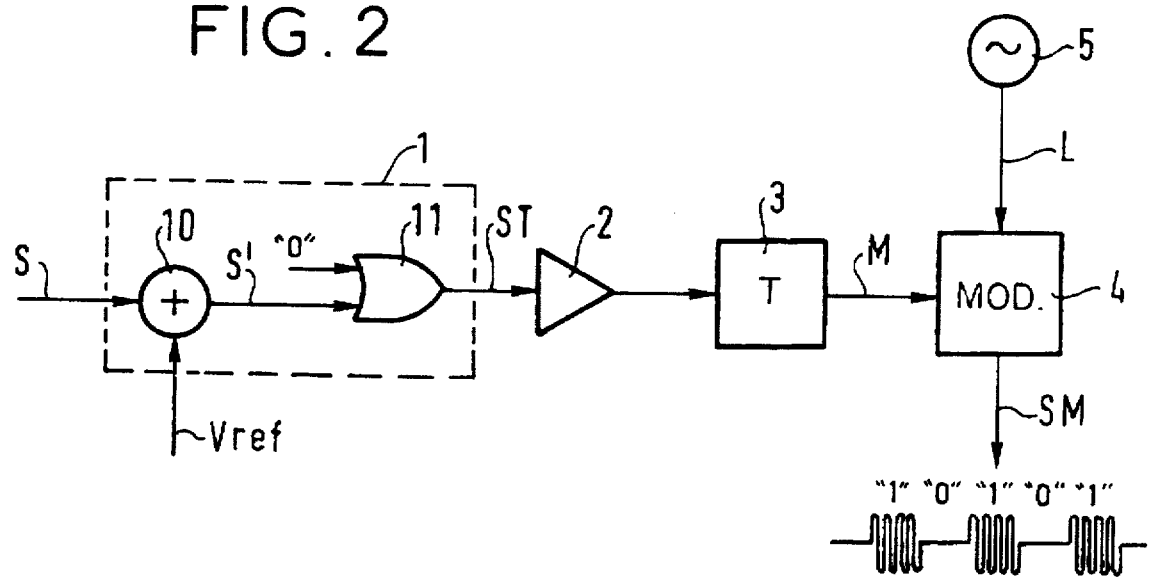
FIG. 2 shows a first embodiment of the invention for amplitude modulating an optical signal with a binary electrical signal.

With reference to FIG. 2, a circuit of the invention for amplitude modulating an optical signal by means of a binary electrical signal comprises a shaping circuit 1 constituting the invention, an electroabsorption or Mach-Zehnder modulator 4, a laser source 5, and preferably an amplifier 2 and a bias T 3. A first input of the electroabsorption modulator 4 receives an optical signal L supplied by a laser source 5. A second input of the modulator 4 receives a modulating signal M. An input binary electrical signal S is applied to said second input via the shaping circuit 1 and optionally via the amplifier 2 and the bias T 3 connected in series with the shaping circuit. The T 3 serves bias the modulator 4 into an appropriate operating zone. The shaping circuit 1 which is thus located upstream from the second input comprises in cascade an adder 10 followed by a two-input OR gate 11 whose output is connected to the input of the amplifier 2. The input binary electrical signal S is applied to a first input of the adder 10 whose second input receives a reference voltage $V_{ref}$. An output of the adder 10 is connected to a first input of the OR gate 11. A second input of the OR gate 11 receives the state "0".

A signal S' defined as $S'=S+V_{ref}$ is delivered at the output of the adder 10. If the voltage corresponding to the "1" state of the binary signal S is written $V_{max}$, then the output from the OR gate 11 switches:

from the "0" state to the "1" state if $S' \geq \frac{1}{2}V_{max}$, i.e. $S+V_{ref} \geq \frac{1}{2}V_{max}$, or else $S \geq V'_{ref}$ where $V'_{ref} = \frac{1}{2}V_{max} - V_{ref}$; and from the "1" state to the "0" state if $S' \leq \frac{1}{2}V_{max}$, or $S+V_{ref} \leq \frac{1}{2}V_{max}$, or indeed $S \leq V'_{ref}$.

Figure 4A:
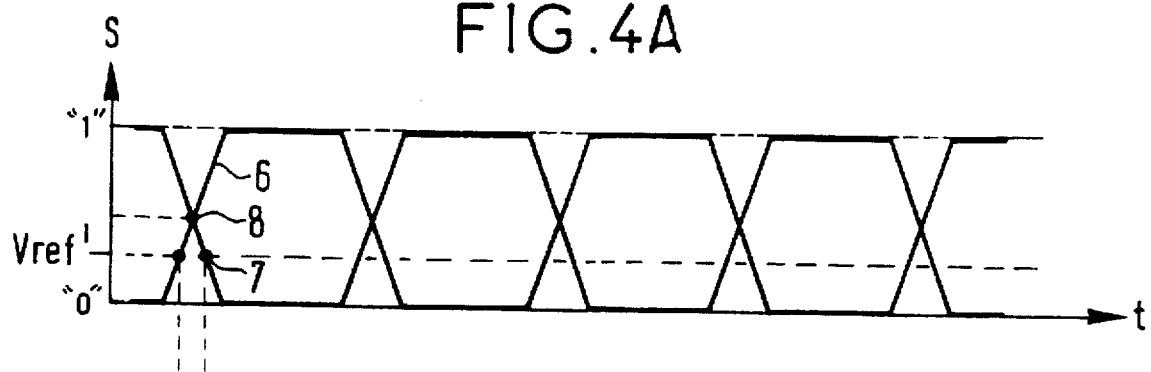
FIGS. 4A, 4B, and 4C are waveform diagrams respectively of: an input binary electrical signal; said binary electrical signal transformed by the invention into a modulating binary electrical signal; and the envelope of the modulated optical signal obtained by the invention at the output from the electroabsorption modulator.
Figure 4B:
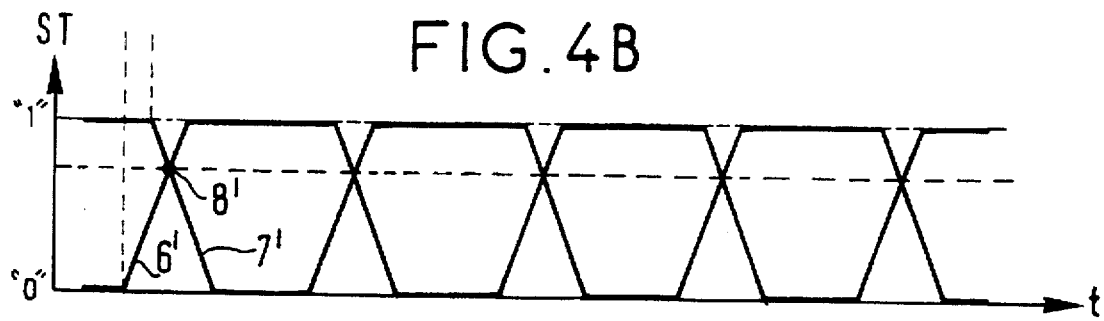

Reference is now made to FIGS. 4A and 4B to explain the function of the shaping circuit 1. In these figures, "1" and "0" bits are superposed.

The output ST from the shaping circuit 1 switches from the "0" state to the "1" state when the level of the rising edge 6 of the input binary signal S is greater than $V_{ref}$. Likewise, the output ST of the shaping circuit 1 switches from the "1" to the "0" state when the level of the falling edge 7 in the input binary signal S is less than $V_{ref}$. Thus, in an eye diagram, when the input binary signal S possesses a point of intersection 8 between its rising and falling edges 6 and 7 that is a midpoint relative to the levels corresponding respectively to the "0" and "1" states, the rising and falling edges 6' and 7' of the signal ST possess the property of intersecting at a point 8' that is not a midpoint.

Figure 1:
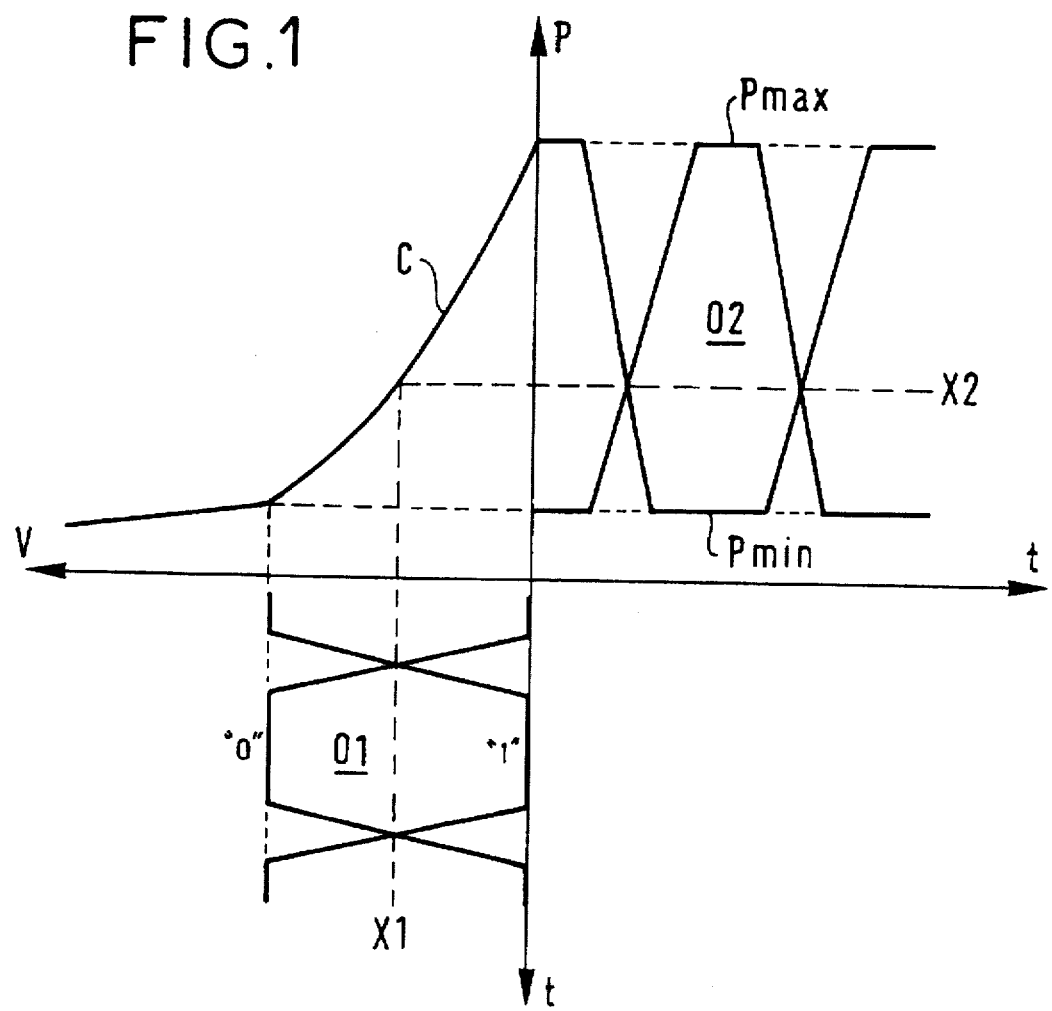
FIG. 1, described above, is a Cartesian diagram for illustrating the non-linear characteristic of the transfer function of an electroabsorption modulator.
Figure 4C:
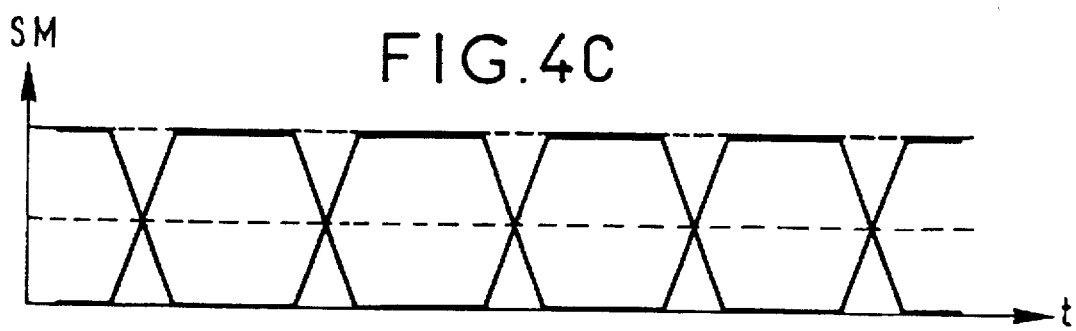

Thus, the binary electrical signal ST for modulating the optical signal L, optionally after amplification 2 and offsetting 3, possesses a modified eye diagram with a modified point of intersection between the rising edge and the falling edge, thereby compensating for the non-linear characteristic of the electroabsorption modulator 4 (FIG. 1). As shown in FIG. 4C, a substantially symmetrical eye diagram is obtained for the envelope of the modulated optical signal at the output from the electroabsorption modulator 4, thus maximizing, for given error rate on reception, the distance that can be travelled by the modulated optical signal.

In practice, the reference voltage $V'_{ref}$ must be adjusted so as to obtain an eye diagram for the envelope of the modulated optical signal that is substantially symmetrical. This voltage $V'_{ref}$ naturally lies between the respective levels associated with the "0" and the "1" states, and is different from those states.

Figure 3:
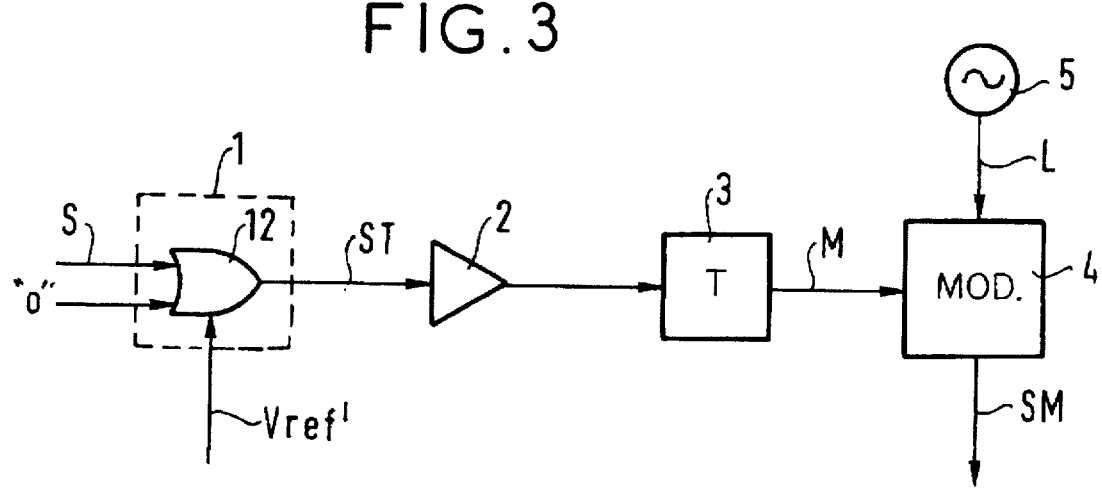
FIG. 3 shows a second embodiment of the invention for amplitude modulating an optical signal with a binary electrical signal.

As shown in FIG. 3, in another variant of the invention, the shaping circuit 1 may be in the form of a single OR gate 12 whose bias voltage is adjusted to $V'_{ref}$. On a first input the OR gate receives the input binary electrical signal S, and on a second input it receives the "0" state. It switches:

from the "0" state to the "1" state if $S \geq V'_{ref}$; and from the "1" state to the "0" state if $S \leq V'_{ref}$.

In yet another variant, the shaping circuit may be in the form of a comparator receiving the input binary electrical signal on a non-inverting input and receiving the reference voltage on an inverting input.

In practice, the invention is particularly advantageous for an input binary electrical signal S at high frequency, e.g. equal to 2.5 GHz. It is nevertheless applicable at any frequency.

The invention could be extended to modulation by means of an N-state binary electrical signal. It would then be necessary to provide shaping means having an output that switches from one of the N states to another of the N states in response to an electrical signal level exceeding a predetermined threshold, and switching back from said other state to said one state in response to an electrical signal level below the predetermined threshold. A respective threshold is then associated with each pair of states between which it is possible to have a transition in the N-state signal. The threshold has a level that lies between and is different from the respective levels taken by the two states under consideration.

We claim:

1. A circuit for amplitude modulating an optical signal by an N-state electrical signal, N being greater than or equal to 2, the circuit comprising:

a modulator having a first input for receiving said optical signal to be modulated and a second input for receiving a modulating electrical signal;

said circuit further comprising, upstream from the second input, shaping means having an input receiving said N-state electrical signal and having an output that switches from one of said N states to another of said N states in response to said N-state electrical signal taking up a level that is greater than a predetermined threshold, and switching from said other state to said one of the N states in response to said N-state electrical signal taking up a level that is less than said predetermined threshold, said predetermined threshold being associated with said pair of states, and having a level that lies between and is different from the respective levels taken by said two states.

2. A circuit according to claim 1, wherein said N-state electrical signal is a binary electrical signal having two states, referred to as a first state and as a second state, and wherein the output of said shaping means switches from the first state to the second state in response to said binary electrical signal taking up a level that is greater than a predetermined threshold, and switches from said second state to said first state in response to said binary electrical signal taking up a level that is less than said predetermined threshold.

3. A circuit according to claim 2, wherein said shaping means are in the form of a two-input OR gate having one of its two inputs receiving said binary electrical signal and having the other of its two inputs connected to said first state, said predetermined threshold corresponding to a reference voltage for said OR gate.

4. A circuit according to claim 2, wherein said shaping means are in the form of a comparator receiving said binary electrical signal on a non-inverting input and receiving the reference signal on an inverting input.

5. A circuit according to claim 1, wherein said optical signal is produced by a laser source.

6. A circuit according to claim 1, wherein the output from said shaping means is applied to said second input of the modulator via an amplifier.

7. A circuit according to claim 1, wherein the output from said shaping means is applied to said second input of the modulator via a bias T.

8. A circuit according to claim 1, wherein the modulator is an electroabsorption modulator.

* * * * *